METHOD OF SEPARATION OF THE BORON ISOTOPES

Filed June 20, 1966 Sheet 1 of 2

3,447,898
Patented June 3, 1969

3,447,898

METHOD OF SEPARATION OF THE BORON ISOTOPES

Marius Chemla, Maisons Alfort, Gregoire Dirian, Palaiseau, and Michele Perie, Bourg-la-Reine, France, assignors to Commissariat à l'Energie Atomique, Paris, France Filed June 20, 1966, Ser. No. 558,773
Claims priority, application France, June 24, 1965, 22,182
Int. Cl. B01d *59/04;* C01b *35/00*
U.S. Cl. 23—59 4 Claims

ABSTRACT OF THE DISCLOSURE

Boron isotopes of mass 10 are separated from those of mass 11 by chemical exchange in a column by forming a boric ester; distilling the ester; and condensing the distilled ester at the top of the column. The ester is then saponified at the top of the column producing an alkaline water-alcohol borate solution which is acidified at the base of the column forming a boric ester. The two isotopes are then separated by chemical exchange and removed at the two extremities of the column.

Figure 1:
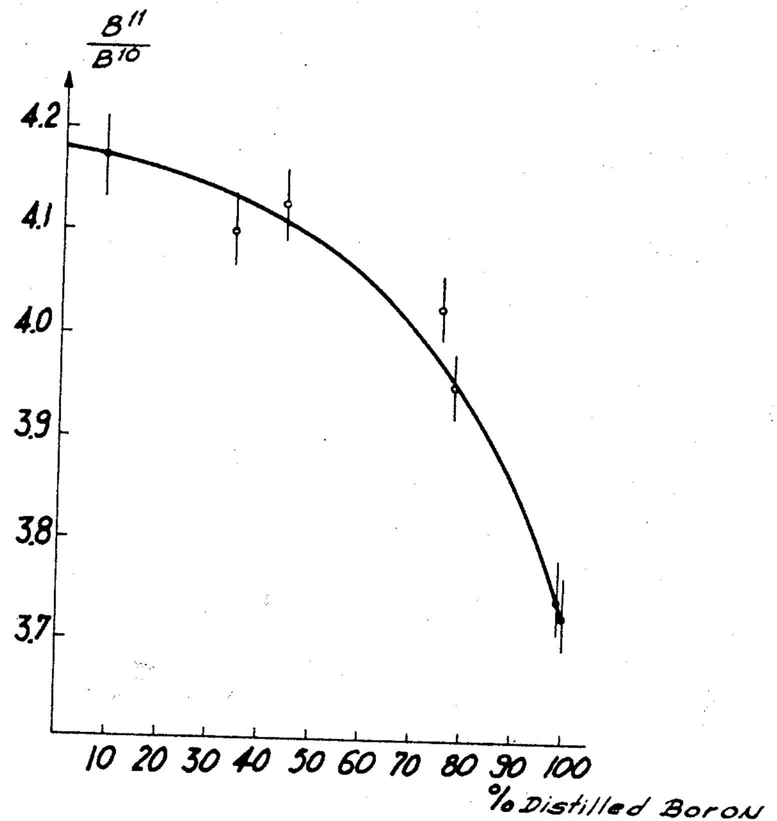

This invention relates to a method of separation of the isotopes of boron $B^{10}$ and $B^{11}$ by chemical exchange, said method being of considerable interest in all applications which relate to the nuclear industry.

The methods of separation of isotopes by chemical exchange present a particularly favorable case on account of the high separation factors employed.

It is known that the value of the isotopic ratio $B^{11}/B^{10}$ is 4.08 in the case of natural boron. In order to separate the boron isotopes, it is known to utilize the exchange reaction between gaseous boron trifluoride and its liquid complex with methyl ether (separation factor $\alpha$ equal to 1.027) or the exchange reaction between boron trifluoride and its liquid complex with ethyl ether (separation factor $\alpha$ equal to 1.026) or alternatively between boron trifluoride and its liquid complex with anisole ($\alpha$ equal to 1.03). The unitary separation factor $\alpha$ is defined by the quotient of the value $B^{11}/B^{10}$ of the distilled fraction by the value $B^{11}/B^{10}$ of the liquid fraction in the state of equilibrium. The utilization of these exchange reactions on an industrial scale is attended by difficulties of a technological order and also entails high capital expenditure. The isotope separation plant must in fact be perfectly leak-tight on account of the chemical aggressiveness of boron trifluoride and must be free of all trace of moisture which increases the corrosive action of $BF_3$. The conversion of boron fluoride which is depleted in the isotope having the mass number 10 into boric acid is an operation which represents an economic loss compared with the commercial price of boric acid.

The method proposed by this invention overcomes the advantages referred-to above. The products which it employs are very inexpensive industrial chemical products and also have practically no corrosive action on the equipment employed.

The method consists in separating the boron isotope having the mass number 10 from the boron isotope having the mass number 11 by chemical exchange between a boric ester and a non-volatile boron compound in solution, the exchange process being carried out in a column by countercurrent contacting of the boric ester in the form of vapors with the solution of the boron compound in liquid form.

The boric ester is advantageously constituted by methyl borate or ethyl borate and the boron compound advantageously consists of an alkali borate such as, for example potassium borate or calcium borate.

The unitary separation factor which is obtained at atmospheric pressure in the case of the exchange reaction between an alkali borate and methyl borate is comparable with the separation factor which is observed in the exchange reaction between boron trifluoride and its liquid complex with anisole.

This separation factor has been determined in the following manner. In 350 ml. of methanol, there were dissolved 3.5 g. of boric acid and 2 g. of sodium hydroxide. The solution was brought to the boiling point, whereupon the methyl borate formed was distilled by maintaining constant the volume of alcohol and by operating at constant acidity by controlled and continuous addition of phosphoric acid. Distillation fractions of predetermined volume were collected and a measurement was then taken of the quantity of methyl borate contained therein until depletion of the initial quantity of boric acid.

In FIG. 1 of the accompanying drawings, there is shown the variation of the isotopic ratio $B^{11}/B^{10}$ of the distilled fraction as a function of the percentage of boron which is eliminated by distillation. The curve which is obtained demonstrates the isotopic effect which can be represented by the formula:

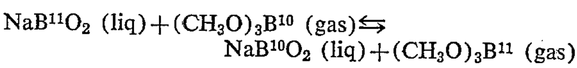

$$NaB^{11}O_2\ (liq) + (CH_3O)_3B^{10}\ (gas) \leftrightarrows NaB^{10}O_2\ (liq) + (CH_3O)_3B^{11}\ (gas)$$

From the experimental data given above, there is deduced the unitary separation factor which is found to be equal to 1.03 in the case of the exchange between sodium borate and methyl borate. In the case of the exchange reaction between sodium borate and ethyl borate, the separation factor is equal to 1.02.

The exchange reaction between boric ester and alkali borate can be carried out in a distillation column of conventional type. However, the column must permit a sufficient number of exchange equilibria between the boric ester and the alkali borate solution. In said column, the exchange takes place between an upflowing stream of vapor of the boric ester and a downflowing stream of alkali borate in solution. It is also important to effect the recycling of the reagents at both ends of the column.

In the case of chemical exchange between methyl borate and sodium borate, the recycling of the reagents can be performed as follows. At the top of the column, methyl borate is condensed by a coolant at the same time as excess methyl alcohol, and is then saponified by the continuous addition of a water-alcohol solution of sodium hydroxide which liberates the methyl alcohol and reforms a water-alcohol solution of sodium borate which is refluxed into the column. At the base of the column, the water-alcohol solution of sodium borate is acidified by a continuous feed of phosphoric acid which initiates the formation of sodium phosphate whilst the liberated boric acid is immediately esterified in the form of methyl borate which distils.

The recycling of the sodium borate solution at the base of the column can also be carried out by treating said solution with a cation exchanger which fixes the sodium and liberates the boric acid. Said exchanger can either be in solid form or in the form of a liquid in solution in a solvent which is immiscible with methyl alcohol so as to permit of continuous reprocessing.

An apparatus which makes it possible to apply the isotopic effect between the alkali borate and the volatile boric ester has been devised by the present applicant and will now be described together with its mode of operation, it being understood that the description which follows is given solely by way of example and not in any limiting sense.

Figure 2:
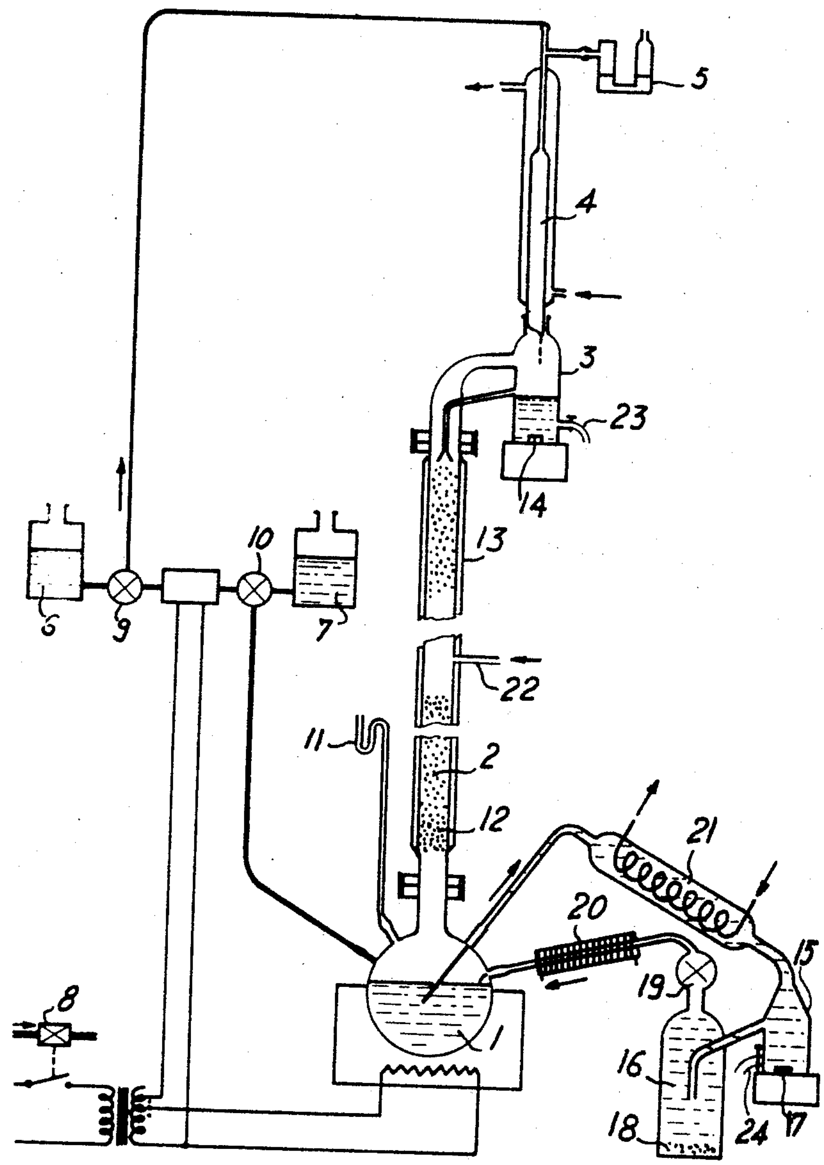

As illustrated in FIG. 2, the apparatus referred to comprises a balloon flask 1 with three Pyrex glass branch tubes and on which is mounted a distillation column designated by the reference numeral 2. The column is heat-insulated with coiled glass wool lagging 13 and packed with Dixon rings 12 which improve the efficiency of the column. The packing 12 is interrupted at the midpoint of the column over a small distance for the purpose of admitting at this point the solution to be treated which consists of a solution of natural boric acid in methyl alcohol. The condenser 3 is surmounted by a cooler 4 and constantly fed with a sodium hydroxide solution in alcohol which is supplied from the reservoir 6 by means of a proportioning pump 9 and delivered by said pump at a flow rate which is suitably adjusted to ensure continuous conversion of the boric ester into sodium borate The solution contained in the condenser is maintained homogeneous by means of a magnetic stirrer 14 which ensures continuous agitation. Leak-tightness at the top of the cooler is ensured by means of a hydraulic trap 5. The sodium borate solution which is enriched with the isotope $B^{11}$ is withdrawn through the cock 23. The apparatus is protected against any danger of overpressure by means of a manometer 11 which is connected to a relay so as to cut off the heating of the balloon flask in the event of an increase in pressure and also serves to regulate the column hold-up. In the case of accidental stoppage of the circulation of the cooling water within the cooler, the apparatus is provided with a manometric device 8 which cuts off the general electric supply to the apparatus in the event of a reduction in water pressure.

The manner in which the apparatus operates is already apparent from the foregoing and will therefore be described only briefly by considering the example of an exchange between methyl borate and sodium borate. The balloon flask 1 is initially filled with a solution containing 20 g. of boric acid in 1.5 liters of 98% commercial methyl alcohol. The solution is brought to the boil at a pressure in the vicinity of atmospheric and the methyl alcohol which contains the esterified boric acid in the form of methyl borate distils at a flow rate of 0.5 liter/hour. In the condenser 3, the methyl borate is condensed and is saponified at the same time by a continuous introduction at a flow rate of 100 cc./24 hours of a water-alcohol solution (75% alcohol—25% water) of 4 N sodium hydroxide supplied from the reservoir 6 which liberates the methyl alcohol and reforms a water-alcohol solution of the sodium borate. This latter is refluxed into the column and returns to the balloon flask in which the solution is enriched with the boron isotope of mass number 10, and this enriched fraction can be withdrawn through the cock 24.

The sodium borate which is diluted in a methyl alcohol solution and derived from the condenser 3 is acidified by means of a continuous introduction of 4 M phosphoric acid in solution in methyl alcohol which is supplied from the reservoir 7. The addition of phosphoric acid has the effect of liberating the boric acid which is immediately esterified. The flow rate of phosphoric acid is a function of the flow rate of the sodium hydroxide solution in alcohol and is regulated so as to ensure constant acidity within the balloon flask. Consequently, the streams of sodium borate and of methyl borate also remain constant throughout the course of the experiment.

In the balloon flask 1, the chemical transformation of the sodium borate into methyl borate under the action of phosphoric acid results in the formation of a residue of sodium phosphate which can be removed in different ways. For example, profitable use can be made of the low solubility when cold of the phosphate in alcohol solution.

The liquid at boiling temperature is brought by pumping through a cooler 21 into a vessel 15 in which crystallization is initiated by magnetic agitation by means of the stirrer 17 and the precipitate 18 is removed by decantation in an auxiliary reservoir 16. The supernatant solution is returned into the balloon flask 1 by means of a circulating pump 19 after having been reheated by the heating elements 20. The risks of crystallization on the walls of the vessels and tubing are prevented by means of a silicone-base anti-adhesive coating.

The sodium phosphate can also be removed by conveying the liquid from the balloon flask into a second distillation column, a small quantity of water being added thereto and the distillation throughput being regulated so that the entire quantity of methyl borate and alcohol is distilled towards the balloon flask and that there thus remains at the bottom of said second column a concentrated aqueous solution of acid sodium phosphate which can then be discharged to waste.

By way of example, the enrichment factor at equilibrium of a coloumn of a given type has been measured in respect of a predetermined throughput. The apparatus employed for this purpose was similar to that which has just been described.

By operating with a column 25 mm. in cross-section and 110 cm. in height of filling on an initial quantity of 8.5 g. of boric acid, the boric acid was divided as follows in the equilibrium state:

2.5 g. at the top of the column with the ratio $B^{11}/B^{10}=5.51\pm0.05$ 6 g. at the base of the column with the ratio $$B^{11}/B^{10}=3.45\pm0.04$$

The enrichment factor at equilibrium is therefore $5.51/3.45=1.60$, which corresponds to a height equivalent theoretical plate (HETP) of 7 cm.

What we claim is:

1. Process for the separation of the isotopes of boron of mass 10 from the isotopes of boron of mass 11 by chemical exchange in a column comprising the steps:

(a) forming a boric ester by reacting boric acid with an alcohol, (b) heating the ester to ebullition and distilling the ester, (c) condensing the distilled ester at the top of the column, (d) saponifying the ester by an alkaline water-alcohol solution at the top of the column freeing the alcohol and an alkaline water alcohol borate solution which flows in the column countercurrent to the boric ester, (e) acidifying the alkaline borate solution at the base of the column freeing boric acid which immediately forms a boric ester, (f) separating the isotopes of boron of mass 10 from the isotopes of boron of mass 11 by chemical exchange between the boric ester and an alkaline borate in water-alcohol solution which circulates countercurrent in the column, and (g) removing the isotopes at the two extemities of the column.

2. Process as described in claim 1, the boric ester being methyl borate.

3. Process as described in claim 1, the boric ester being ethyl borate.

4. Process as described in claim 1, the alkaline borate diluted in an alcohol solution flowing in the column being acidified at the base of the column by a continuous flow of phosphoric acid in solution in alcohol.

References Cited

UNITED STATES PATENTS

| | | | |
|---|---|---|---|
| 2,796,330 | 6/1957 | Crist et al. | |
| 3,050,367 | 8/1962 | Holmberg ------------ | 203—5 |

OTHER REFERENCES

Conn et al.: "Industrial and Engineering Chemistry," vol. 50, September 1958, pp. 1231–1234.

Kiss et al.: "Nuclear Science Abstracts," vol. 17, 1963, Abstracts 390 and 391, p. 56.

Kiss et al.: "Nuclear Science Abstracts," vol. 15, 1961, Abstracts 31090, p. 4004.

Palko: "Industrial & Engineering Chemistry," vol. 51, February 1959, pp. 121–124.

Urey et al.: "Journal of American Chemical Society," vol. 57, February 1935, pp. 321–327.

HERBERT T. CARTER, *Primary Examiner.*

U.S. Cl. X.R.

23—149, 204; 203—5; 260—462